April 13, 1954
J. O. DAVIS ET AL
2,675,254
COUPLER
Filed July 15, 1950
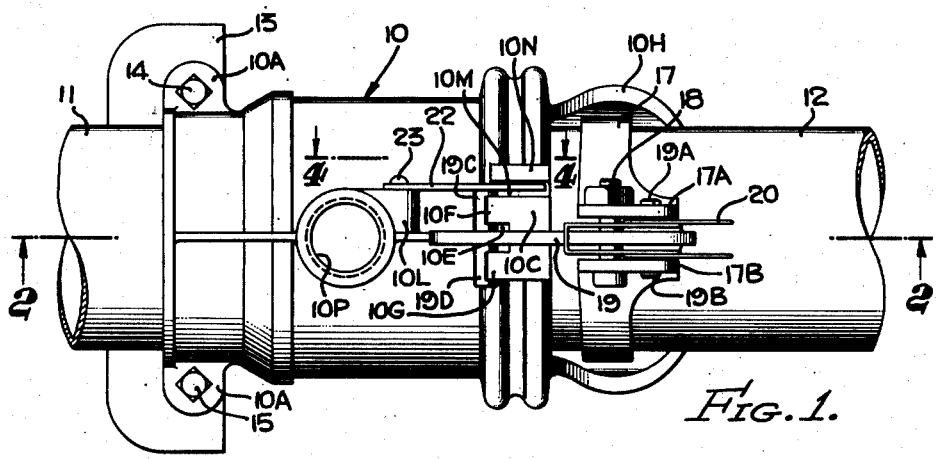
Fig.1.
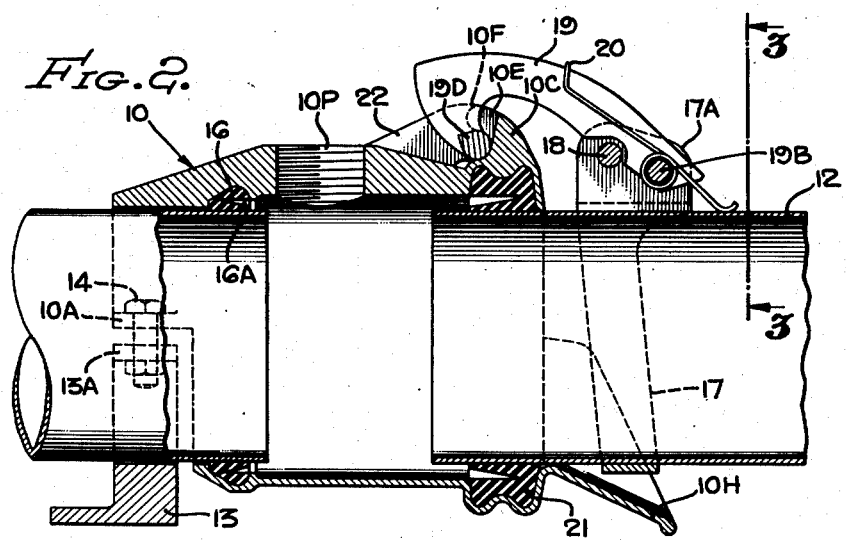
Fig.2.
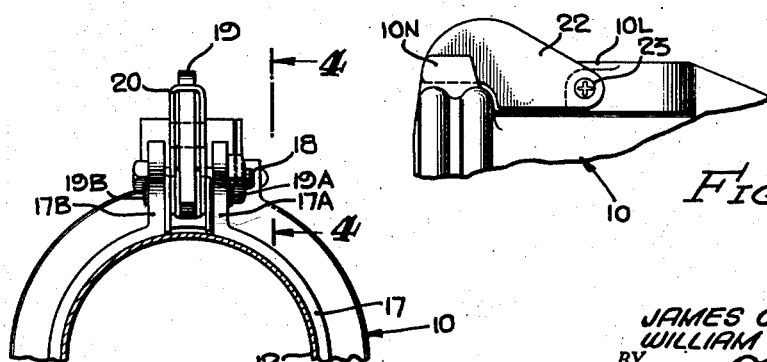
Fig.3.
Fig.4.
INVENTORS
JAMES O. DAVIS
WILLIAM ECKARDT
BY
Lyon & Lyon
ATTORNEYS Patented Apr. 13, 1954

2,675,254

UNITED STATES PATENT OFFICE 2,675,254

COUPLER

James O. Davis, Altadena, and William Eckardt, La Canada, Calif., assignors, by direct and mesne assignments, to The Hardie Manufacturing Company, Hudson, Mich., a corporation of Michigan Application July 15, 1950, Serial No. 174,044

3 Claims. (Cl. 285—172)

The present invention relates to an improved pipe coupler especially useful in connecting large diameter pipes as used for irrigation purposes.

It is desirable to provide a coupler which allows quick and easy attachment and detachment of various large diameter pipe sections and yet with resulting watertight connections. It is particularly desirable to provide a coupler of this type which may be used at night where the latching elements may not be visible.

More specifically, the present invention contemplates the provision of novel latching means which may be quickly engaged and disengaged, and once engaged provides a good lock to prevent accidental or inadvertent separation of the component pipe sections and associated coupling.

It is therefore an object of the present invention to provide an improved pipe coupler of this character featured by the novel latching mechanism, the component parts of which may be moved to locking position either in the day or at night when the parts may not be visible.

Another object of the present invention is to provide improved latching means which assures a good lock between the pipe section and its coupling element, and particularly prevents the pipe sections from rotating about its axis in such pipe coupler.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a view in plan elevation of an improved pipe coupler with large diameter pipes inserted therein, one of such pipe sections being latched to the coupler with improved latching means embodying important features of the present invention;

Figure 2 is a sectional view taken substantially on the line 2—2 of Figure 1;

Figure 3 is a view taken substantially on the line 3—3 of Figure 2; and

Figure 4 is a view taken substantially on the line 4—4 of Figures 1 and 3.

Referring to Figure 1, the elements shown therein comprise essentially the coupler 10 with the pipe sections of large diameter 11, 12 extending therein. The pipe section 11 is maintained in semi-permanent fixed position within the coupler 10 by means of a split clamp which includes the pedestal 13 having a pair of apertured ears 13A, 13A thereon, with the apertured portions of such ears in registry with apertured portions 10A, 10A of coupler 10, there being provided bolts 14, 15 passing through the aligned apertures in the members 10, 13 for purposes of clamping the pipe section 11 within the coupler 10.

Referring specifically to Figure 2, it is observed that the chevron type of resilient gasket 16 disposed in an annular recess in the pipe coupler 10 presses against the inserted end of the pipe section 11 to provide a watertight pressure seal between the coupler 10 and the pipe section 11. It is observed that this sealing member 16, due to the particular position of its V-slot 16A therein, with the open end of the V facing the center of the coupling 10, tends to expand more and more to provide a better seal, the greater the water pressure within the coupler 10.

The other pipe section 12 is arranged for quick attachment and detachment to and from the coupler 10 by the means described presently which forms an important part of the present invention.

The pipe section 12 has mounted thereon the split ring 17, opposite adjacent ends 17A, 17B thereof extending radially outwardly and in spaced relationship, and having aligned apertures therethrough through which a clamping bolt 18 passes to secure such split ring 17 on the pipe 12.

The ring 17 pivotally mounts the latching link 19, which is adapted to cooperate with the bifurcated latching lock 10C integrally formed with the coupler 10. To secure such pivotal mounting of the link 19, which is in the form of a plate, there is provided on such link 19 a pair of axle portions 19A, 19B, which extend perpendicular from the plane of the member 19 and which pass through aligned apertures in the spaced portion 17A, 17B, respectively, of the split clamping ring 17.

This latching member 19 is biased for counterclockwise movement in Figure 2 about the axis of its axles 19A, 19B by spring means which may take different forms and shapes and, for example, as shown herein, may comprise a spring wire 20 bent in the form of a hairpin to straddle the link 19 and with intermediate portions of legs of the hairpin encircling the axles 19A, 19B, and with the extremities of such legs bearing against the pipe section 12, as shown in Figure 2, for purposes of biasing the latching link 19 for rotation in the counterclockwise direction. Such counterclockwise motion of the link 19 is limited by an intermediate portion of the link 19 engaging the clamping bolt 18.

An important feature of the present invention resides in the interrelationship of the free or head end of the latching link 19 and the latching lug 10C. The head end of the latching link 19 is provided with a pair of integrally formed horizontally extending latching arms 19C, 19D. The head end is formed generally in the form of a hook which is adapted to enter the slotted portion 10E which separates the bifurcated portions 10F, 10G of the bifurcated latch lock 10C. These bifurcated portions 10F, 10G define an interrupted groove with which the latch arms 19C, 19D may engage. The hooked end or head of the latching link 19 to limit rotational movement of the pipe section 12 about its own axis, although allowing some limited movement whereby such pipe section may align itself. Movement of the pipe section 12 along its longitudinal direction out of the pipe coupler 10 is limited, of course, by the spaced arms 19C, 19D engaging respectively the interrupted groove formed on the lower side of the portions 10F, 10G.

A similar chevron type of resilient gasket 21, maintained in a recess within the coupler 10, acts between the coupler 10 and the inserted end of the pipe section 12 to provide a good seal therebetween.

In order to facilitate the attachment of the pipe section 12 to the coupler 10, an apron portion 10H may be integrally formed with the coupler 10, such apron portion 10H, as shown in Figures 1 and 2, being disposed adjacent the ground and provides an inclined plane up which the end of the pipe 12 is guided in the process of inserting the end into the coupler.

Also, to facilitate this operation, there may be provided a stop or abutment plate 22 which is mounted for pivotal movement about the axis of the pin 23 secured in an integrally formed abutment 19L on the coupler 10. The free end of this abutment plate 22 is disposed in a slot 10M defined by the bifurcated portion 10F and the abutment 10N. This abutment plate 22 co-operates with the arm 19C of the swinging latch member 19 to align the body of the link 19 with the slotted portion 10E. Thus, in the process of inserting the pipe end 12 into the coupler 10, the inclined apron portion 10H serves to guide the end of the pipe section 12 into the coupler, and the pipe section 12 is thus injected into the coupler 10 until the clamping ring 17 engages the adjacent end of the coupler 10, whereby further inward movement of the pipe section 12 is prevented. At the same time, the lower surface of the head end of the link 19 is urged upwardly as it moves over the adjacent curved surface of the latch part 10C. The head end is then urged by the spring 20 downwardly into slot 10E. When this condition is attained, the pipe section 12 is rotated about its own axis until the arm 19C engages the abutment plate 22; and when this condition is attained, the pipe section 12 may be pulled a slight distance in the direction out of the coupler 10 to dispose the hooked end of the link 19 between the bifurcated portions 10F, 10G.

If desired, the coupler 10 may be provided with a tapped hole 10P, for example, to receive a 1¼ inch standard pipe section for overhead irrigation purposes and the like.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a coupling for a pair of telescoping members: a latch link having an end head portion and an opposite end pivotally mounted on one of the members on an axis transverse to the members; a pair of latch arms extending transversely of the head end and on opposite sides of said head end; a cooperating latch part carried by the other member, and defining a groove engageable by the latch arms, said groove having an overhanging portion limiting unlatching movement of the head end, said overhanging portion having a slot to permit entry of the head portion for latching engagement; and an abutment carried by said other member and extending past the free end of one of the latch arms, and aligning the slot and the head when the abutment engages said free end.

2. In a coupling for a pair of telescoping members: a latch link having an end head portion and an opposite end pivotally mounted on one of the members on an axis transverse to the members; a pair of latch arms extending transversely of the head end and on opposite sides of said head end; a cooperating latch part carried by the other member, and defining a groove engageable by the latch arms, said groove having an overhanging portion limiting unlatching movement of the head end, said overhanging portion having a slot to permit entry of the head portion for latching engagement; means limiting relative inward telescoping movement of the members to a point where the arms clear said overhanging portion; and an abutment carried by said other member and extending past the free end of one of the latch arms, and aligning the slot and the head when the abutment engages said free end.

3. In a coupling for a pair of telescoping members: a latch link having an end head portion and an opposite end pivotally mounted on one of the members on an axis transverse to the members; a pair of latch arms extending transversely of the head end and on opposite sides of said head end; a cooperating latch part carried by the other member, and defining a groove engageable by the latch arms, said groove having an overhanging portion limiting unlatching movement of the head end, said overhanging portion having a slot to permit entry of the head portion for latching engagement; and a pivoted abutment carried by said other member and positionable about its pivot to extend past the free end of one of the latch arms, and aligning the slot and the head when the abutment engages said free end.

References Cited in the file of this patent

UNITED STATES PATENTS

| Number | Name | Date |
|---|---|---|
| 1,078,067 | Shaffer | Nov. 11, 1913 |
| 1,812,678 | Bernert | June 30, 1931 |
| 2,449,735 | Wyss | Sept. 21, 1948 |
| 2,464,466 | Stout | Mar. 15, 1949 |
| 2,494,854 | Anderson | Jan. 17, 1950 |
| 2,499,476 | Eyerly | Mar. 7, 1950 |
| 2,526,754 | Johnson et al. | Oct. 24, 1950 |

FOREIGN PATENTS

| Number | Country | Date |
|---|---|---|
| 451,018 | France | Jan. 31, 1913 |